United States Patent Office 3,308,018
Patented Mar. 7, 1967

3,308,018
CARBAMATE FUNGICIDES AND NEMATOCIDES
Delta W. Gier, Parkville, and Ralph W. Pritchard II, Kansas City, Mo., assignors to Chemagro Corporation, New York, N.Y., a corporation of New York
No Drawing. Filed Mar. 11, 1965, Ser. No. 439,069
20 Claims. (Cl. 167—30)

The present invention relates to novel fungicides and nematocides.

It is an object of the present invention to kill nematodes.

Another object is to kill fungi.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing as nematocides and fungicides carbamates having the formula

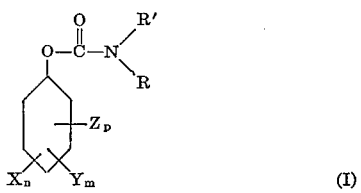

(I)

where X is chlorine, Y is nitro, Z is methyl or hydrogen, R and R' are hydrogen, phenyl, tolyl, chlorophenyl, alkyl or cycloalkyl, $n$ and $m$ are integers from 1 to 3 and $p$ is an integer from 0 to 3 inclusive.

Many of these carbamates are old. Whether new or old the carbamates can be prepared in the manner taught in Lambrech Patent 2,933,383. More preferably, however, they are prepared in the manner set forth below.

Reaction 1

One mole of the appropriate phenol was placed in a round bottom flask equipped with a reflux condenser, 500 ml. of carbon tetrachloride was added as a solvent. One mole of the appropriate isocyanate and a catalytic quantity of pyridine (0.5 ml. of pyridine) was added and the mixture was refluxed for three hours. After standing overnight 300 ml. of hot n-hexane was added. The crude carbamate was precipitated upon cooling, collected by filtration, washed with cold n-hexane and recrystallized from hexane or benzene-hexane mixture.

The compounds employed in the present invention in which at least one of R and R' in the formula set forth above is aryl or chlorophenyl are new compounds.

In preparing the compounds employed in the present invention by Reaction 1 as phenols there can be employed:

2,4,5-trichloro-6-nitrophenol,
2,6-dichloro-4-nitrophenol,
2,4-dichloro-6-nitrophenol,
4-chloro-2,6-dinitrophenol,
2-chloro-4-nitrophenol,
3-chloro-4-nitrophenol,
4-chloro-2-nitrophenol,
4-chloro-3-methyl-2-nitrophenol,
2,4,6-trichloro-3-nitrophenol,
2,5-dichloro-4-nitrophenol,
2,3-dichloro-6-nitrophenol,
2-chloro-5-nitrophenol,
4-chloro-2-methyl-6-nitrophenol,
4-chloro-2,3-dimethyl-6-nitrophenol,
2-chloro-3,5-dinitrophenol.

As isocyanates which can be employed in Reaction 1 there can be used methyl isocyanate, ethyl isocyanate, propyl isocyanate, butyl isocyanate, isopropyl isocyanate, sec. butyl isocyanate, amyl isocyanate, hexyl isocyanate, octyl isocyanate, cyclohexyl isocyanate, octadecyl isocyanate, phenyl isocyanate, o-tolyl isocyanate, p-tolyl isocyanate, m-tolyl isocyanate, o-chlorophenyl isocyanate, m-chlorophenyl isocyanate, p-chlorophenyl isocyanate, 2,4-dichlorophenyl isocyanate, 2,4,5-trichlorophenyl isocyanate.

Typical examples of carbamates which have been prepared by Reaction 1 and their melting points and yields are set forth in Table 1.

TABLE 1

| Compound | M.P., °C. | Yield, Percent |
|---|---|---|
| 2,4,5-trichloro-6-nitrophenyl N-methyl carbamate | 78–80 | 45 |
| 2,4,5-trichloro-6-nitrophenyl N-ethyl carbamate | 130–131 | 61 |
| 2,4,5-trichloro-6-nitrophenyl N-propyl carbamate | 110–112 | 41 |
| 2,4,5-trichloro-6-nitrophenyl N-butyl carbamate | 95–97 | 44 |
| 2,4,5-trichloro-6-nitrophenyl N-cyclohexyl carbamate | 89–91 | 80 |
| 2,4,5-trichloro-6-nitrophenyl N-octadecyl carbamate | 88–90 | 77 |
| 2,4,5-trichloro-6-nitrophenyl N-phenyl carbamate | 104–106 | 63 |
| 2,4,5-trichloro-6-nitrophenyl N-o-chlorophenyl carbamate | 130–131 | 37 |
| 2,4,5-trichloro-6-nitrophenyl N-m-chlorophenyl carbamate | 142–144 | 60 |
| 2,4,5-trichloro-6-nitrophenyl N-p-chlorophenyl carbamate | 139–141 | 66 |
| 2,4,5-trichloro-6-nitrophenyl N-o-tolyl carbamate | 157–159 | 36 |
| 2,4,5-trichloro-6-nitrophenyl N-m-tolyl carbamate | 150–154 | 25 |
| 2,6-dichloro-4-nitrophenyl N-methyl carbamate | 173–176 | 58 |
| 2,6-dichloro-4-nitrophenyl N-propyl carbamate | 97–98 | 35 |
| 2,6-dichloro-4-nitrophenyl N-butyl carbamate | 118–120 | 62 |
| 2,6-dichloro-4-nitrophenyl N-p-chlorophenyl carbamate | 149–152 | 71 |
| 2,4-dichloro-6-nitrophenyl N-methyl carbamate | 138–140 | 93 |
| 2,4-dichloro-6-nitrophenyl N-ethyl carbamate | 111–113 | 52 |
| 2,4-dichloro-6-nitrophenyl N-propyl carbamate | 116–117 | 53 |
| 2,4-dichloro-6-nitrophenyl N-butyl carbamate | 103–105 | 59 |
| 2,4-dichloro-6-nitrophenyl N-cyclohexyl carbamate | 94–96 | 53 |
| 2,4-dichloro-6-nitrophenyl N-octadecyl carbamate | 85–87 | 73 |
| 2,4-dichloro-6-nitrophenyl N-phenyl carbamate | 100–103 | 49 |
| 2,4-dichloro-6-nitrophenyl N-o-chlorophenyl carbamate | 116–118 | 56 |
| 2,4-dichloro-6-nitrophenyl N-m-chlorophenyl carbamate | 118–120 | 47 |
| 2,4-dichloro-6-nitrophenyl N-p-chlorophenyl carbamate | 118–119 | 52 |
| 2,4-dichloro-6-nitrophenyl N-o-tolyl carbamate | 110–112 | 26 |
| 2,4-dichloro-6-nitrophenyl N-m-tolyl carbamate | 112–115 | 44 |
| 4-chloro-2,6-dinitrophenyl N-methyl carbamate | 70–72 | 18 |
| 4-chloro-2,6-dinitrophenyl N-propyl carbamate | 80–82 | 40 |
| 4-chloro-2,6-dinitrophenyl N-butyl carbamate | 92–93 | 45 |
| 4-chloro-2,6-dinitrophenyl N-p-chlorophenyl carbamate | 97–99 | 97 |
| 2-chloro-4-nitrophenyl N-methyl carbamate | 99–100 | 42 |
| 2-chloro-4-nitrophenyl N-propyl carbamate | 74–76 | 33 |
| 2-chloro-4-nitrophenyl N-butyl carbamate | 78–79 | 70 |
| 2-chloro-4-nitrophenyl N-p-chlorophenyl carbamate | 140–142 | 100 |
| 3-chloro-4-nitrophenyl N-methyl carbamate | 75–76 | 55 |
| 3-chloro-4-nitrophenyl N-propyl carbamate | 48–50 | 33 |

TABLE 1—Continued

| Compound | M.P., °C. | Yield, Percent |
|---|---|---|
| 3-chloro-4-nitrophenyl N-butyl carbamate | 48–50 | 20 |
| 3-chloro-4-nitrophenyl N-p-chlorophenyl carbamate | 155–156 | 100 |
| 4-chloro-2-nitrophenyl N-methyl carbamate | 82–84 | 89 |
| 4-chloro-2-nitrophenyl N-propyl carbamate | 83–84 | 38 |
| 4-chloro-2-nitrophenyl N-butyl carbamate | 78–80 | 29 |
| 4-chloro-2-nitrophenyl N-p-chlorophenyl carbamate | 166–168 | 97 |
| 4-chloro-3-methyl-2-nitrophenyl N-methyl carbamate | 107–109 | 38 |
| 4-chloro-3-methyl-2-nitrophenyl N-propyl carbamate | 66–68 | 36 |
| 4-chloro-3-methyl-2-nitrophenyl N-butyl carbamate | 96–98 | 39 |
| 4-chloro-3-methyl-2-nitrophenyl N-p-chlorophenyl carbamate | 160–162 | 100 |

Other carbamates which can be employed according to the invention are 2,4,5-trichloro-6-nitrophenyl N-octyl carbamate,
2,4,6-trichloro-3-nitrophenyl N-butyl carbamate,
2,5-dichloro-4-nitrophenyl N-phenyl carbamate,
2,4,5 - trichloro - 6 - nitrophenyl N - 2,4 - dichlorophenyl carbamate.

There also can be employed N,N disubstituted carbamates. These latter type compounds are prepared by the method of Lambrech and include 4-chloro-2-nitrophenyl N,N-dimethyl carbamate,
4-chloro-2-nitrophenyl N,N-diphenyl carbamate,
2,4,5-trichloro-6-nitrophenyl N,N-dibutyl carbamate,
2,4,5-trichloro-6-nitrophenyl N,N-dimethyl carbamate,
2,4,5-trichloro-6-nitrophenyl N-methyl N-butyl carbamate,
2,4,5-trichloro-6-nitrophenyl N,N-diphenyl carbamate.
2,4,5 - trichloro - 6 - nitrophenyl N,N-di-p-chlorophenyl carbamate,
2,4,5-trichloro-6-nitrophenyl N,N-di-o-tolyl carbamate,
2,4,5-trichloro-6-nitrophenyl N,N-diisopropyl carbamate,
2,4,5 - trichloro - 6 - nitrophenyl N,N-di (2-ethylhexyl) carbamate,
2,4,5-trichloro-6-nitrophenyl N,N-dibutyl carbamate,
2,4,5-trichloro-6-nitrophenyl carbamate.

The compounds of the present invention can be used alone as nematocides and fungicides but it has been found desirable to apply them to the pest, e.g., to the soil habitat of nematodes, together with inert solids to form dusts, or more preferably, suspended in a suitable liquid diluent, e.g., water. They can be applied at widely varying rates, e.g., 0.1–30 lbs./acre.

There can also be added surface active agents or wetting agents and inert solids in such liquid formulations. Desirably, 0.05–1% by weight of surface active or wetting agent is employed. The active ingredient can be from 0.01 to 95% by weight of the entire composition in such case.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate, and butyl acetate, ethers, e.g., ethylene glycol monomethyl ether and diethylene glycol monomethyl ether, alcohols, e.g., ethanol, methanol, isopropanol, amyl alcohol, ethylene glycol, propylene glycol, butyl carbitol acetate and glycerine. Mixtures of water and organic solvents, either as solutions or emulsions, can be employed.

The novel pesticides can also be applied as an aerosol, e.g., by dispersing them in air by means of a compressed gas such as dichlorodifluoromethane or trichlorofluoromethane and other Freons, for example.

The pesticide of the present invention can also be applied with nematocidal and fungicidal adjuvants or carriers such as talc, pyrophylite, synthetic fine silica, attapulgus clay, kieselguhr, chalk, diatomaceous earth, lime, calcium carbonate, bentonite, fuller's earth, cottonseed hulls, wheat flour, soybean flour, pumice, tripoli, wood flour, walnut shell flour, redwood flour and lignin.

It is frequently desirable to incorporate a surface active agent in the pesticidal compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl group, alkylphenyl ethylene oxide condensation products, e.g., p-isoctylphenol condensed with 10 ethylene oxide units, soaps, e.g., sodium stearate and potassium oleate, sodium salt of propylnaphthalene sulfonic acid, (di-2-ethylhexyl) ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids, and rosin acids, e.g., Ethofat 7 and 13, sodium N-methyl-N-oleyltaurate, Turkey red oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide-propylene oxide condensation products, e.g., Pluronic 61 (molecular weight 1000), sorbitan sesquioleate, polyethylene glycol ester of tall oil acids, sodium octyl phenoxyethoxyethyl sulfate, tris (polyoxyethylene) sorbitan monostearate (Tween 60), sodium dihexyl sulfosuccinate, a tris (polyoxylalkylene) monolaurate (Tween 20).

The solid and liquid formulations can be prepared by any of the conventional procedures. Thus, the active ingredient can be mixed with the solid carrier in finely divided form in amounts small enough to preserve the free-flowing property of the final dust composition.

The compounds of the present invention are useful as soil fungicides, seed protectants, seed disinfectants, foliar fungicides and in other fungicidal applications.

In the following examples illustrating nematocidal and fungicidal activity the carbamates were in some cases formulated as wettable powders consisting of 50% of the carbamate, 46% ultra-fine silica, 2% sodium lignin sulfonate and 2% Pluronic L-61 (polyethylene oxidepolypropylene oxide adduct molecular weight about 1000). This wettable powder is hereinafter designated as Formulation A.

In the following tables the substituents are those in the following Formula II

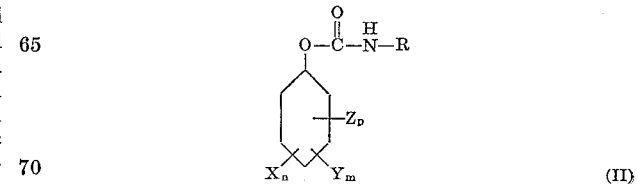

where X is chlorine, Y is nitro, Z is methyl or hydrogen, R is as indicated, $n$ is an integer of 1 to 3, $m$ is an integer of 1 to 2 and $p$ is 1.

The saprophytic nematode tests recorded in Table 2 were carried out in water as the medium with *Panagrellus spp.* and *Rhabditis spp.* at room temperature. The results were recorded as percent kill after a 2-day incubation period. The blank mortality was 0–10% kill. The compounds were tested at the indicated rates.

TABLE 2

| X | Y | Z | R | 400 p.p.m. | 200 p.p.m. | 100 p.p.m. | 50 p.p.m. | 25 p.p.m. | 12.5 p.p.m. |
|---|---|---|---|---|---|---|---|---|---|
| 2,4,5-trichloro | 6-nitro | H | Methyl | | 100 | 100 | 50 | 10 | 10 |
| 2,4,5-trichloro | 6-nitro | H | Ethyl | | 100 | 100 | 100 | 100 | 100 |
| 2,4,5-trichloro | 6-nitro | H | Butyl | | 100 | 100 | 100 | 100 | 80 |
| 2,4,5-trichloro | 6-nitro | H | Cyclohexyl | | 30 | 10 | 10 | 10 | 10 |
| 2,4,5-trichloro | 6-nitro | H | p-Chlorophenyl | | 50 | 30 | 10 | 10 | 10 |
| 2,4,5-trichloro | 6-nitro | H | o-Tolyl | 50 | 30 | | 10 | | |
| 2,4,5-trichloro | 6-nitro | H | m-Tolyl | 50 | 30 | | 10 | | |
| 2,6-dichloro | 4-nitro | H | Methyl | | 100 | 50 | 30 | 10 | 10 |
| 2,6-dichloro | 4-nitro | H | Propyl | | 100 | 100 | 100 | 100 | 100 |
| 2,6-dichloro | 4-nitro | H | Butyl | | 100 | 100 | 100 | 50 | 50 |
| 2,4-dichloro | 6-nitro | H | Methyl | 80 | 50 | | 30 | | |
| 2,4-dichloro | 6-nitro | H | o-Chlorophenyl | | 100 | 50 | 30 | 10 | 10 |
| 2,4-dichloro | 6-nitro | H | m-Chlorophenyl | | 30 | 10 | 10 | 10 | 10 |
| 2,4-dichloro | 6-nitro | H | p-Chlorophenyl | | 100 | 100 | 80 | 50 | 30 |
| 4-chloro | 2,6-dinitro | H | Methyl | | 50 | 30 | 10 | 10 | 10 |
| 4-chloro | 2,6-dinitro | H | Propyl | | 100 | 100 | 80 | 50 | 50 |
| 2-chloro | 4-nitro | H | Methyl | | 100 | 50 | 30 | 10 | 10 |
| 2-chloro | 4-nitro | H | Propyl | | 50 | 30 | 10 | 10 | 10 |
| 2-chloro | 4-nitro | H | Butyl | | 100 | 100 | 50 | 30 | 30 |
| 3-chloro | 4-nitro | H | Propyl | | 100 | 100 | 80 | 50 | 50 |
| 4-chloro | 2-nitro | H | Methyl | | 100 | 100 | 50 | 30 | 10 |
| 4-chloro | 2-nitro | H | Propyl | | 100 | 80 | 50 | 30 | 10 |
| 4-chloro | 2-nitro | 3-methyl | Methyl | | 100 | 100 | 50 | 30 | 10 |
| 4-chloro | 2-nitro | 3-methyl | Propyl | | 100 | 100 | 50 | 10 | 10 |

It was found in the test that if R was an alkyl group above about 6, that the saprophytic nematocide activity was considerably reduced. The best saprophytic nematocides were the trichloro mono nitrophenyl N-alkyl carbamates having 2 to 4 carbon atoms in the alkyl group and the dichloro mono nitrophenyl N-alkyl carbamates having 2 to 4 carbon atoms in the alkyl group.

In the parasitic nematode tests using Formulation A and tomato seedlings as the test plants in soil naturally infested with *Meloidogyne spp.* the results were recorded 4 to 5 weeks after planting on a scale where 0 indicated severe knotting and 10 indicated an absence of root knots. The only tested compounds which showed effectiveness at 50 ppm. were 2-chloro-4-nitrophenyl N-methyl carbamate (rating 5.1); 4-chloro-2,6-dinitrophenyl N-methyl carbamate (rating 7.6), 4-chloro-2-nitrophenyl N-methyl carbamate (rating 10), and 4-chloro-3-methyl-2-nitrophenyl N-methyl carbamate (rating 10). On the whole the compounds of the present invention are more effective against saprophytic nematodes than parasitic nematodes.

The compounds were also tested against various fungi. In the spore germination test the compound was prepared as a 1% suspension in water and this mixture added to agar-agar solution and the solution allowed to solidify. The mixture was inoculated with spores of *Alternaria spp.* and *Ustilago spp.* and incubated for 24 hours. The results were recorded in Table 3 on a 0 to 10 scale with 10 indicating no spore germination and 0 indicating full germination.

TABLE 3

| X | Y | Z | R | Organism | 1,000 p.p.m. | 100 p.p.m. | 10 p.p.m. |
|---|---|---|---|---|---|---|---|
| 2,4,5-trichloro | 6-nitro | H | Methyl | Alt | 10 | 0 | 0 |
| | | | | Ust | 5 | 0 | 0 |
| 2,4,5-trichloro | 6-nitro | H | Ethyl | Alt | 10 | 10 | 0 |
| | | | | Ust | 10 | 0 | 0 |
| 2,4,5-trichloro | 6-nitro | H | Propyl | Alt | 10 | 8 | 3 |
| 2,4,5-trichloro | 6-nitro | H | Butyl | Alt | 8 | 4 | 2 |
| 2,4,5-trichloro | 6-nitro | H | Cyclohexyl | Alt | 10 | 0 | 0 |
| | | | | Ust | 10 | 0 | 0 |
| 2,4,5-trichloro | 6-nitro | H | o-Chlorophenyl | Alt | 8 | 5 | 2 |
| 2,4,5-trichloro | 6-nitro | H | m-Chlorophenyl | Alt | 8 | 3 | 1 |
| 2,4,5-trichloro | 6-nitro | H | p-Chlorophenyl | Alt | 8 | 5 | 2 |
| 2,6-dichloro | 4-nitro | H | Methyl | Alt | 10 | 5 | 0 |
| | | | | Ust | 10 | 0 | 0 |
| 2,6-dichloro | 4-nitro | H | Propyl | Alt | 10 | 10 | 5 |
| | | | | Ust | 10 | 5 | 0 |
| 2,6-dichloro | 4-nitro | H | Butyl | Alt | 10 | 5 | 0 |
| | | | | Ust | 10 | 0 | 0 |
| 2,4-dichloro | 6-nitro | H | Ethyl | Alt | 10 | 8 | 3 |
| 2,4-dichloro | 6-nitro | H | Cyclohexyl | Alt | 10 | 7 | 3 |
| 2,4-dichloro | 6-nitro | H | o-Chlorophenyl | Alt | 3 | 1 | 0 |
| 2,4-dichloro | 6-nitro | H | m-Chlorophenyl | Alt | 8 | 4 | 0 |
| 2,4-dichloro | 6-nitro | H | p-Chlorophenyl | Alt | 1 | 0 | 0 |
| 4-chloro | 2,6-dinitro | H | Methyl | Alt | 10 | 0 | 0 |
| | | | | Ust | 5 | 0 | 0 |
| 4-chloro | 2,6-dinitro | H | Propyl | Alt | 10 | 10 | 0 |
| | | | | Ust | 10 | 10 | 0 |
| 2-chloro | 4-nitro | H | Methyl | Alt | 10 | 5 | 0 |
| | | | | Ust | 10 | 0 | 0 |
| 2-chloro | 4-nitro | H | Propyl | Alt | 10 | 0 | 0 |
| | | | | Ust | 10 | 0 | 0 |
| 2-chloro | 4-nitro | H | Butyl | Alt | 10 | 0 | 0 |
| | | | | Ust | 10 | 0 | 0 |
| 3-chloro | 4-nitro | H | Propyl | Alt | 10 | 5 | 0 |
| | | | | Ust | 10 | 0 | 0 |
| 4-chloro | 2-nitro | H | Methyl | Alt | 10 | 5 | 0 |
| | | | | Ust | 10 | 5 | 0 |
| 4-chloro | 2-nitro | H | Propyl | Alt | 10 | 5 | 0 |
| | | | | Ust | 10 | 10 | 8 |
| 4-chloro | 2-nitro | 3-methyl | Methyl | Alt | 10 | 5 | 0 |
| | | | | Ust | 10 | 0 | 0 |
| 4-chloro | 2-nitro | 3-methyl | Propyl | Alt | 10 | 0 | 0 |
| | | | | Ust | 10 | 0 | 0 |

It was observed in this test that when R was an alkyl above six carbon atoms the fungicidal activity dropped off.

The carbamates were also subjected to an agar plate fungicide test. The compound was prepared as a 1% suspension in water and this mixture added to agar-agar solution and the solution allowed to solidify. The solid mixture was then inoculated with the indicated fungi which were allowed to grow for 7 days. Inhibition of mycelial growth is recorded in Table 4 on a 0–10 scale with 0 being no inhibition and 10 being complete inhibition of fungi growth. In Table 4 the abbreviations are:

P is *Pythium irregulare*
C is *Colletotrichum obiculare* von Arx
F is *Fusarium lycopersici*
H is *Helminthosporium sativum*
R is *Rhizoctonia solani*
V is *Verticillium albo-atrum*

TABLE 4

| X | Y | Z | R | Rate, p.p.m. | Organism | | | | | |
|---|---|---|---|---|---|---|---|---|---|---|
| | | | | | P | C | F | H | R | V |
| 2,4,5-trichloro | 6-nitro | H | Methyl | 1,000 | 10 | | 10 | 10 | 10 | 10 |
| | | | | 100 | 10 | | 8 | 10 | 10 | 10 |
| | | | | 10 | 5 | | 5 | 5 | 5 | 5 |
| 2,4,5-trichloro | 6-nitro | H | Ethyl | 1,000 | 8 | | 8 | 8 | 8 | |
| | | | | 100 | 0 | | 5 | 0 | 8 | |
| | | | | 10 | 0 | | 0 | 0 | 5 | |
| 2,4,5-trichloro | 6-nitro | H | Propyl | 1,000 | 10 | | 10 | 10 | 10 | |
| | | | | 100 | 10 | | 8 | 10 | 10 | |
| | | | | 10 | 10 | | 8 | 8 | 5 | |
| 2,4,5-trichloro | 6-nitro | H | Butyl | 1,000 | 10 | | 10 | 10 | 10 | |
| | | | | 100 | 10 | | 10 | 10 | 10 | |
| | | | | 10 | 0 | | 0 | 8 | 5 | |
| 2,4,5-trichloro | 6-nitro | H | Cyclohexyl | 1,000 | 10 | | 8 | 10 | 10 | 8 |
| | | | | 100 | 10 | | 8 | 10 | 10 | 5 |
| | | | | 10 | 5 | | 5 | 5 | 5 | 0 |
| 2,4,5-trichloro | 6-nitro | H | Octadecyl | 1,000 | 8 | | 5 | 8 | 5 | |
| | | | | 100 | 5 | | 0 | 5 | 5 | |
| | | | | 10 | 0 | | 0 | 0 | 0 | |
| 2,4,5-trichloro | 6-nitro | H | o-Chlorophenyl | 1,000 | 10 | | 10 | 10 | 10 | |
| | | | | 100 | 10 | | 0 | 0 | 0 | |
| 2,4,5-trichloro | 6-nitro | H | m-Chlorophenyl | 1,000 | 10 | | 10 | 10 | 10 | |
| | | | | 100 | 10 | | 0 | 0 | 0 | |
| 2,4,5-trichloro | 6-nitro | H | p-Chlorophenyl | 1,000 | 10 | | 10 | 10 | 10 | |
| | | | | 100 | 10 | | 0 | 0 | 0 | |
| 2,4,5-trichloro | 6-nitro | H | o-Tolyl | 500 | | 8 | 8 | 8 | 10 | 8 |
| | | | | 100 | | 8 | 5 | 8 | 8 | 5 |
| | | | | 10 | | 5 | 2 | 5 | 5 | 0 |
| 2,4,5-trichloro | 6-nitro | H | m-Tolyl | 500 | | 8 | 8 | 8 | 10 | 8 |
| | | | | 100 | | 8 | 5 | 8 | 8 | 5 |
| | | | | 10 | | 5 | 0 | 5 | 8 | 0 |
| 2,6-dichloro | 4-nitro | H | Methyl | 1,000 | 10 | | 10 | 10 | 10 | 10 |
| | | | | 100 | 10 | | 8 | 8 | 10 | 10 |
| | | | | 10 | 5 | | 5 | 5 | 5 | 5 |
| 2,6-dichloro | 4-nitro | H | Propyl | 1,000 | 8 | | 10 | 8 | 8 | |
| | | | | 100 | 5 | | 5 | 5 | 5 | |
| | | | | 10 | 0 | | 0 | 0 | 0 | |
| 2,6-dichloro | 4-nitro | H | Butyl | 500 | | 10 | 10 | 10 | 10 | 10 |
| | | | | 100 | | 10 | 8 | 8 | 8 | 8 |
| | | | | 10 | | 5 | 5 | 5 | 5 | 0 |
| 2,4-dichloro | 6-nitro | H | Methyl | 500 | | 10 | 10 | 10 | 10 | 10 |
| | | | | 100 | | 10 | 10 | 10 | 10 | 10 |
| | | | | 10 | | 8 | 8 | 10 | 10 | 10 |
| 2,4-dichloro | 6-nitro | H | Ethyl | 1,000 | 10 | | 10 | 10 | 10 | |
| | | | | 100 | 10 | | 10 | 10 | 10 | |
| | | | | 10 | 10 | | 8 | 10 | 5 | |
| 2,4-dichloro | 6-nitro | H | Cyclohexyl | 1,000 | 10 | | 10 | 10 | 10 | |
| | | | | 100 | 10 | | 10 | 10 | 10 | |
| | | | | 10 | 10 | | 8 | 10 | 5 | |
| 2,4-dichloro | 6-nitro | H | Octadecyl | 1,000 | 8 | | 8 | 8 | 8 | |
| | | | | 100 | 8 | | 8 | 8 | 8 | |
| | | | | 10 | 8 | | 8 | 8 | 8 | |
| 2,4-dichloro | 6-nitro | H | o-Chlorophenyl | 1,000 | 10 | | 10 | 10 | 10 | |
| | | | | 100 | 10 | | 10 | 10 | 10 | |
| | | | | 10 | 10 | | 10 | 10 | 10 | |
| 2,4-dichloro | 6-nitro | H | m-Chlorophenyl | 1,000 | 10 | | 10 | 10 | 10 | |
| | | | | 100 | 10 | | 10 | 10 | 10 | |
| | | | | 10 | 10 | | 10 | 10 | 10 | |
| 2,4-dichloro | 6-nitro | H | p-Chlorophenyl | 1,000 | 10 | | 10 | 10 | 10 | |
| | | | | 100 | 10 | | 10 | 10 | 10 | |
| | | | | 10 | 10 | | 10 | 10 | 10 | |
| 4-chloro | 2,6-dinitro | H | Methyl | 1,000 | 10 | | 10 | 10 | 10 | 10 |
| | | | | 100 | 10 | | 8 | 8 | 10 | 10 |
| | | | | 10 | 0 | | 0 | 5 | 5 | 0 |
| 4-chloro | 2,6-dinitro | H | Propyl | 1,000 | 8 | | 8 | 8 | 8 | |
| | | | | 100 | 5 | | 5 | 5 | 5 | |
| | | | | 10 | 0 | | 0 | 0 | 0 | |
| 2-chloro | 4-nitro | H | Methyl | 1,000 | 10 | | 10 | 10 | 10 | 10 |
| | | | | 100 | 10 | | 10 | 10 | 10 | 10 |
| | | | | 10 | 10 | | 8 | 8 | 10 | 10 |
| 2-chloro | 4-nitro | H | Propyl | 1,000 | 10 | | 10 | 10 | 10 | 10 |
| | | | | 100 | 10 | | 10 | 10 | 10 | 10 |
| | | | | 10 | 5 | | 5 | 5 | 5 | 8 |
| 2-chloro | 4-nitro | H | Butyl | 1,000 | 10 | | 10 | 10 | 10 | 10 |
| | | | | 100 | 10 | | 10 | 10 | 10 | 10 |
| | | | | 10 | 10 | | 8 | 8 | 10 | 10 |
| 3-chloro | 4-nitro | H | Propyl | 1,000 | 10 | | 8 | 8 | 8 | |
| | | | | 100 | 10 | | 8 | 8 | 8 | |
| | | | | 10 | 0 | | 5 | 5 | 5 | |
| 4-chloro | 2-nitro | H | Methyl | 1,000 | 10 | | 10 | 10 | 10 | 10 |
| | | | | 100 | 10 | | 10 | 10 | 10 | 10 |
| | | | | 10 | 10 | | 10 | 10 | 10 | 10 |
| 4-chloro | 2-nitro | H | Propyl | 1,000 | 8 | | 8 | 9 | 9 | |
| | | | | 100 | 8 | | 8 | 9 | 9 | |
| | | | | 10 | 8 | | 8 | 9 | 9 | |
| 4-chloro | 2-nitro | 3-methyl | Methyl | 1,000 | 10 | | 10 | 10 | 10 | 10 |
| | | | | 100 | 10 | | 10 | 10 | 10 | 10 |
| | | | | 10 | 8 | | 8 | 10 | 10 | 10 |
| 4-chloro | 2-nitro | 3-methyl | Propyl | 500 | 10 | | 10 | 10 | 10 | 10 |
| | | | | 100 | 10 | | 10 | 10 | 10 | 10 |
| | | | | 10 | 10 | | 8 | 10 | 10 | 10 |

The compounds were tested in Formulation A as soil fungicides by adding the Formulation A to soil infested with *Pythium spp.* and one day later planting pea seeds in the soil. The soil containing the seeds was kept at 40° F. for 5 days and then at 75° F. for 4 days. Fungi control is recorded in Table 5 on a 0–10 scale where 0 is no control and 10 is perfect control. The successful results in the soil fungicide tests are also indicative of successful use of the compounds as seed protectants and seed disinfectants. The rates are of the active ingredient in lbs./acre.

TABLE 5

| X | Y | Z | R | 200 lbs./acre | 50 lbs./acre |
|---|---|---|---|---|---|
| 2,4,5-trichloro | 6-nitro | H | Methyl | 7 | 7 |
| 2,4,5-trichloro | 6-nitro | H | Ethyl | 6 | 7 |
| 2,4,5-trichloro | 6-nitro | H | Propyl | 8 | 7 |
| 2,4,5-trichloro | 6-nitro | H | Butyl | 6 | 7 |
| 2,4,5-trichloro | 6-nitro | H | Cyclohexyl | 3 | 4 |
| 2,4,5-trichloro | 6-nitro | H | Octadecyl | 8 | 0 |
| 2,4,5-trichloro | 6-nitro | H | o-Chlorophenyl | 3 | 0 |
| 2,4,5-trichloro | 6-nitro | H | m-Chlorophenyl | 4 | 3 |
| 2,4,5-trichloro | 6-nitro | H | p-Chlorophenyl | 8 | 2 |
| 2,4,5-trichloro | 6-nitro | H | o-Tolyl | 9 | 7 |
| 2,4,5-trichloro | 6-nitro | H | m-Tolyl | 7 | 3 |
| 2,6-dichloro | 4-nitro | H | Methyl | 6 | 7 |
| 2,6-dichloro | 4-nitro | H | Propyl | 4 | 4 |
| 2,4-dichloro | 6-nitro | H | Methyl | 10 | 8 |
| 2,4-dichloro | 6-nitro | H | Ethyl | 10 | 6 |
| 2,4-dichloro | 6-nitro | H | Cyclohexyl | 10 | 9 |
| 2,4-dichloro | 6-nitro | H | Octadecyl | 7 | 7 |
| 2,4-dichloro | 6-nitro | H | o-Chlorophenyl | 8 | 8 |
| 2,4-dichloro | 6-nitro | H | m-Chlorophenyl | 6 | 8 |
| 4-chloro | 2,6-dinitro | H | Methyl | 3 | 8 |
| 4-chloro | 2,6-dinitro | H | Propyl | 7 | 7 |
| 2-chloro | 4-nitro | H | Methyl | 10 | 9 |
| 2-chloro | 4-nitro | H | Propyl | 7 | 7 |
| 2-chloro | 4-nitro | H | Butyl | 8 | 6 |
| 3-chloro | 4-nitro | H | Propyl | 10 | 8 |
| 4-chloro | 2-nitro | H | Methyl | 8 | 3 |
| 4-chloro | 2-nitro | H | Propyl | 8 | 6 |
| 4-chloro | 2-nitro | 3-methyl | Methyl | 9 | 6 |
| 4-chloro | 2-nitro | 3-methyl | Propyl | 8 | 1 |

Some of the more active soil fungicides in Table 5 were further tested in a secondary soil fungicide test similar to that in Table 5 but with a broader range of dosages (active ingredient in lbs./acre) as set forth in Table 6.

TABLE 6

| X | Y | R | 200 | 100 | 50 | 25 | 12.5 |
|---|---|---|---|---|---|---|---|
| 2,4,5-trichloro | 6-nitro | Ethyl | 9 | 9 | 7 | 7 | 7 |
| 2,4,5-trichloro | 6-nitro | Propyl | 7 | 4 | 4 | 2 | 0 |
| 2,4,5-trichloro | 6-nitro | Butyl | 9 | 4 | 4 | 4 | 4 |
| 2,4,5-trichloro | 6-nitro | o-Tolyl | 6 | 6 | 1 | 0 | 0 |
| 2,6-dichloro | 4-nitro | Methyl | 9 | 9 | 9 | 9 | 9 |
| 2,4-dichloro | 6-nitro | Methyl | 9 | 9 | 9 | 5 | 0 |
| 2,4-dichloro | 6-nitro | Ethyl | 9 | 8 | 5 | 5 | 0 |
| 2,4-dichloro | 6-nitro | Cyclohexyl | 9 | 8 | 6 | 6 | 6 |
| 2,4-dichloro | 6-nitro | Octadecyl | 9 | 8 | 6 | 7 | 5 |
| 4-chloro | 2,6-dinitro | Methyl | 9 | 9 | 9 | 9 | 8 |
| 4-chloro | 2,6-dinitro | Propyl | 7 | 7 | 7 | 6 | 5 |
| 2-chloro | 4-nitro | Methyl | 10 | 10 | 8 | 7 | 5 |
| 2-chloro | 4-nitro | Propyl | 10 | 9 | 9 | 6 | 3 |
| 2-chloro | 4-nitro | Butyl | 9 | 9 | 9 | 6 | 2 |
| 3-chloro | 4-nitro | Propyl | 9 | 9 | 8 | 6 | 4 |
| 4-chloro | 2-nitro | Propyl | 6 | 7 | 4 | 2 | 0 |

As stated, the compounds of the present invention are useful as seed protectants. Thus they can be used to coat the seeds or they can be admixed with the seeds, e.g., at a rate of 10 ounces per bushel of corn using 2,4,5-trichloro-6-nitrophenyl N-ethyl carbamate.

What is claimed is:

1. A process of killing a pest selected from the group consisting of nematodes and fungi comprising applying to the pest a carbamate having the formula $$\underset{X_n \quad Y_m}{\underset{|}{\bigcirc}}\!\!\!-\!\!\!\underset{Z_p}{\phantom{|}}\!\!\!-\!\!\!O-\overset{O}{\underset{\|}{C}}-N\!\!<\!\!\overset{R'}{R}$$

where X is chlorine, Y is nitro, Z is selected from the group consisting of methyl and hydrogen, R and R' are selected from the group consisting of hydrogen, phenyl, tolyl, chlorophenyl, alkyl and cycloalkyl, $n$ and $m$ are integers from 1 to 3 and $p$ is an integer from 0 to 3.

2. A process according to claim 1 wherein the pest is nematodes.

3. A process according to claim 1 wherein the pest is fungi.

4. A process of killing nematodes comprising applying to the nematodes a nematocidally effective amount of a di to trichloro mono nitrophenyl N-lower alkyl carbamate.

5. A process according to claim 4 wherein the alkyl group has 2 to 4 carbon atoms.

6. A process according to claim 5 wherein the nematodes are saprophytic nematodes.

7. A process of killing fungi comprising applying to the fungi a fungicidally effective amount of a mono to trichloro mono to dinitro phenyl N-alkyl carbamate.

8. A process according to claim 7 wherein the alkyl group has 1 to 6 carbon atoms.

9. A process of killing fungi comprising applying to the fungi a fungicidally effective amount of a mono chloro mono methyl mono nitro phenyl N-alkyl carbamate.

10. A process of killing fungi comprising applying to the fungi a fungicidally effective amount of a mono to trichloro mono to dinitrophenyl N-chlorophenyl carbamate.

11. A process of killing fungi comprising applying to the fungi a fungicidally effective amount of a dichloro mono nitrophenyl N-mono chlorophenyl carbamate.

12. A process of killing fungi comprising applying to the fungi a fungicidally effective amount of a trichloro mono nitrophenyl N-mono chlorophenyl carbamate.

13. A process of killing fungi comprising applying to the fungi a fungicidally effective amount of a mono to trichloro mono to dinitrophenyl N-carbocyclic aryl carbamate where the aryl is of the phenyl series and has 6 to 7 carbon atoms.

14. A process according to claim 7 wherein the fungi are soil fungi.

15. A process according to claim 14 wherein the alkyl group has 2 to 4 carbon atoms.

16. A process according to claim 9 wherein the fungi are soil fungi.

17. A process according to claim 10 wherein the fungi are soil fungi.

18. A process according to claim 11 wherein the fungi are soil fungi.

19. A process according to claim 12 wherein the fungi are soil fungi.

20. A process according to claim 13 wherein the fungi are soil fungi.

References Cited by the Examiner

UNITED STATES PATENTS

| | | | |
|---|---|---|---|
| 2,933,383 | 4/1960 | Lambrech | 71—2.6 |
| 2,945,877 | 7/1960 | Zima et al. | 260—471 |
| 2,951,786 | 9/1960 | Pullen et al. | 167—30 |
| 3,062,707 | 11/1962 | Kohn et al. | 167—30 |
| 3,076,741 | 2/1963 | Kohn et al. | 167—30 |
| 3,215,595 | 11/1965 | Bocker et al. | 167—30 |

FOREIGN PATENTS 961,042  3/1957  Germany.

OTHER REFERENCES

Kolbezen et al., "Insecticidal Activity of Carbamate Cholinesterase Inhibitors," J. Ag. Food Chem. 2: 864–870 (1954).

Chem. Abstracts 50: 16016i to 16017a (1956).

Chemical Abstracts 53: 1558a (1959).

Metcalf et al., "Insecticidal Carbamates," J. Econ. Entomol. 55: 889 to 894 (1962).

Spector, "Handbook of Biological Data," pages 392 to 397, 500 to 502, 508 to 509, pub. 1956 by W. B. Saunders Co., Philadelphia, Pa.

LEWIS GOTTS, *Primary Examiner.*

SHEP K. ROSE, *Assistant Examiner.*